Sept. 10, 1974  H. E. JENSEN  3,834,945
WATER-COOLED INDUSTRIAL BATTERY
Filed Feb. 5, 1973  2 Sheets-Sheet 1

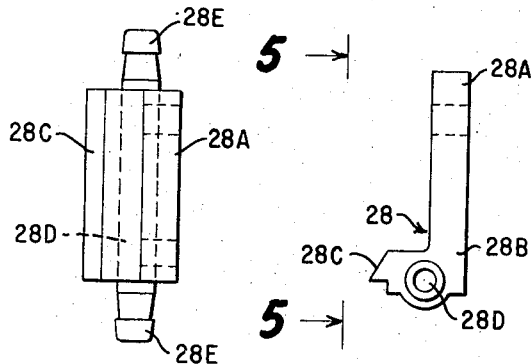
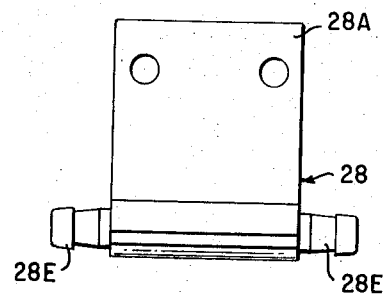
Fig. 3  Fig. 4  Fig. 5
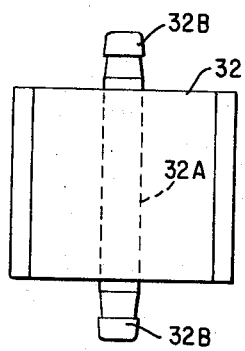
Fig. 6
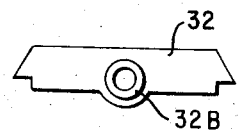
Fig. 7
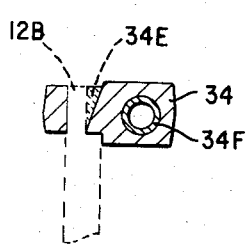
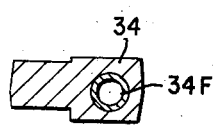
Fig. 9  Fig. 10
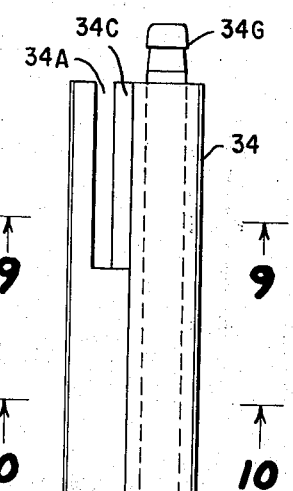
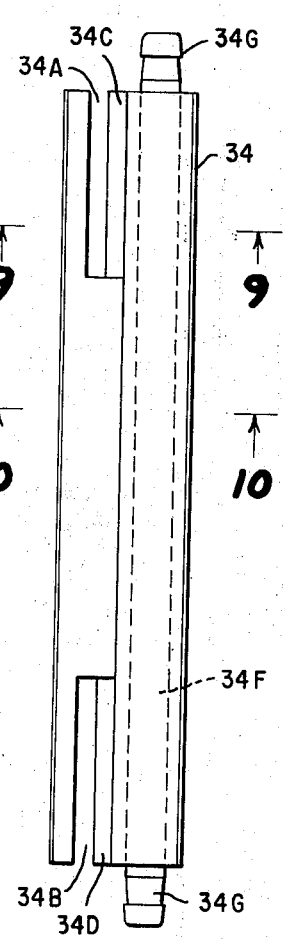
Fig. 8

United States Patent Office 3,834,945
Patented Sept. 10, 1974

3,834,945
WATER-COOLED INDUSTRIAL BATTERY
Henry E. Jensen, Lafayette Hill, Pa., assignor to
Eltra Corporation, Toledo, Ohio
Filed Feb. 5, 1973, Ser. No. 329,878
Int. Cl. H01m 11/00
U.S. Cl. 136—161                                         1 Claim

ABSTRACT OF THE DISCLOSURE

An industrial vehicular motive power battery is disclosed which incorporates means for circulating cooling or heating fluids in the intercell connectors of the battery cells, the intercell connectors are then encapsulated with a suitable resin to obviate leakage under adverse atmospheric conditions and contamination when higher battery voltages are utilized. The resin encapsulation also protects personnel from such higher voltages when seated on the battery to operate the vehicle.

---

In industrial batteries for motive power of vehicles such as trucks or lifts, the trend is toward using higher voltages such as 72 volts for the batteries supplying the power. This results in leakage problems with batteries having exposed terminals and intercell connectors when contamination or dirt of various kinds are encountered and accumulate on the exposed battery terminals on the battery top.

To obviate these problems with these batteries, a layer of encapsulating resin is poured in liquid form on the battery top which hardens into a smooth layer of insulating material pierced only by apertures through which water may be added to the individual battery cells to maintain the electrolyte level therein at the operative level. This relatively thick layer of insulating material on the battery top tends to trap heat in the cells, particularly when a rapid charge is being applied to replenish the power in the cells. Provision is therefore made for cooling to remove this heat from the cells to maintain a battery cell temperature which is not destructive of the cell components.

To provide a continuous passageway for the flow of cooling media such as water, metal tubes are embedded into the intercell connectors, interrow connectors and terminals during the casting step. The connectors and terminals are then burned to the cell terminals and plastic hoses connected to them to make a complete circuit of the terminals to provide the desired cooling. The encapsulation is provided thereafter.

It is a principal object of this invention to provide a cooling system for an industrial size battery which may be encapsulated in a resin body to provide a means to obviate short circuits by leakage paths under adverse conditions and to provide protection to personnel active about the battery.

It is a further object of this invention to encapsulate the connectors and terminals of a battery with a relatively high voltage to prevent short circuits and to protect operators active around the battery.

Other objects and advantages of this invention relating to the arrangement, operation and function of the related elements of the structure, to various details of construction, to combinations of parts and to economies of manufacture will be apparent to those skilled in the art upon consideration of the following description and appended claim, reference being had to the accompanying drawings forming a part of this specification wherein like reference characters designate corresponding parts in the several views.

FIGS. 3, 4 and 5 are plan and elevational views of a battery terminal.

FIGS. 6 and 7 are plan and elevational views of a connector strap.

FIG. 8 is a plan view of a connector strap suitable for use at the ends of the battery.

FIGS. 9 and 10 are cross-sectional views taken along indicated lines on FIG. 8.

Figure 1:
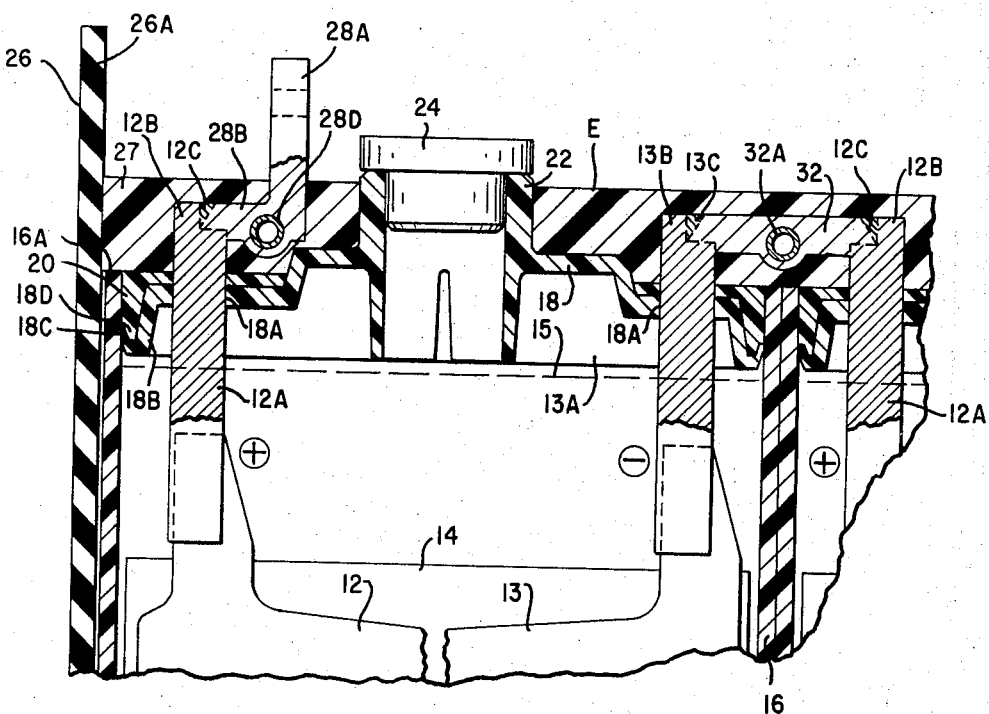
FIG. 1 is a cross-sectional view of a battery cell portion to which the invention has been applied.

Referring to the drawings, particularly to FIG. 1, the upper portions of two adjacent cells are shown of a battery of the lead-acid type wherein positive and negative plates 12 and 13 are interleaved together separated by suitable separators 14 all immersed in a sulphuric acid electrolyte 15 which is contained in a suitable case 16 of plastic or the like to form a conventional battery cell. The positive and negative plates are connected by burning in groups by terminal members 12A and 13A which project upwardly above the top edge 16A of the case 16, and through suitable apertures 18A in a cover 18 for the case 16. The cover 18 projects downwardly at 18B being provided with a deflectable and upperwardly projecting lip 18C to form an annular pocket 18D into which a thermoplastic sealing compound 20 is poured to seal the cover 18 with reference to the casing 16 and also to seal the terminals 12A and 13A with reference to the cover.

The cover 18 is provided with a conventional centrally-located filler opening in the form of an integral tube 22 which projects both above and below the main plane of the cover as shown. A vent plug 24 of any suitable design is friction-fitted into the upper end of the tube 22 to prevent egress of the acid electrolyte and to vent gases from the cell interior. At the same time it allows servicing of the cell for low electrolyte level, acid gravity readings and the like by removal of the vent plug.

Figure 2:
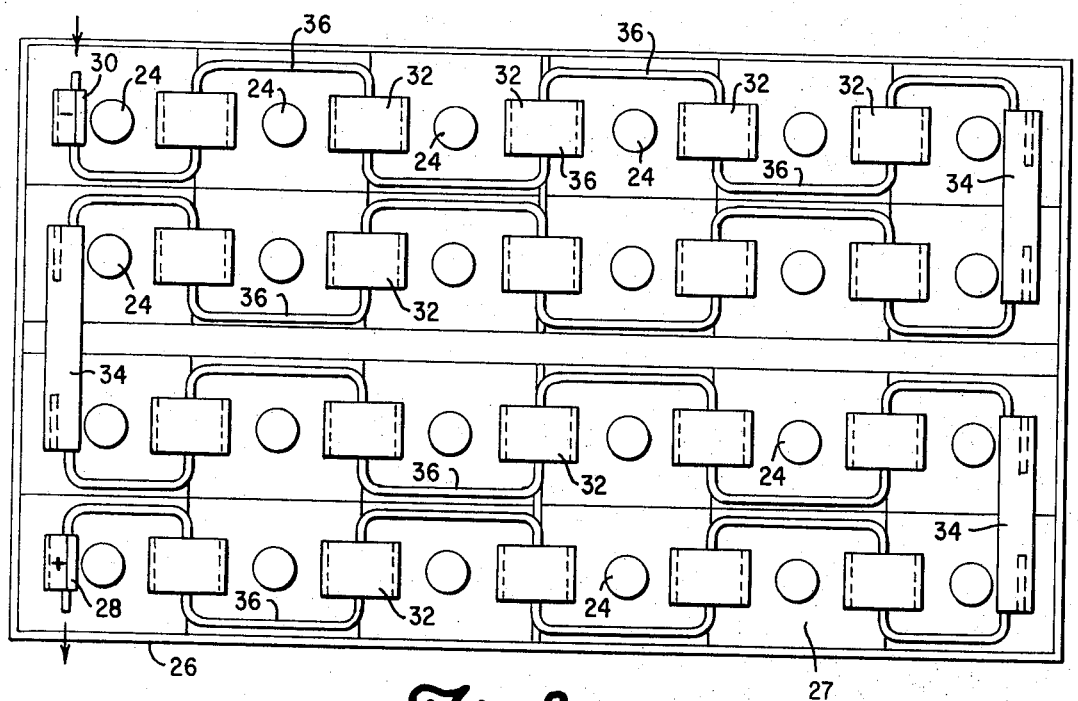
FIG. 2 is a plan view of a complete battery showing the tubes for cooling the battery with the encapsulation removed.

Referring to FIG. 2, a multicell battery is shown with twenty four separate cells, all connected in series to provide a forty-eight volt battery. All of the cells are constructed in the same manner as the cell shown in FIG. 1 with each cell mounted in a separate container in contiguous touching relation with the container of the next cell as shown in FIG. 1. All of the cell containers or cases are mounted in a suitable metal box 26 with an insulated coating or it can be made of fiber glass or structual foam which has a raised edge 26A as best seen in FIG. 1. At this point it will be appreciated that the cooperation of cell covers 18 with each other and raised edge 26A of box 26 forms an encapsulation material receiving receptable 27. In FIG. 2, the encapsulation 26 of the terminals in receptable 27 on the upper surface of the battery has been removed to show the details of the cooling means for the battery.

The battery as shown in FIG. 2, has a positive terminal 28 and a negative terminal 30 by which it is connected to an outside power circuit. The details of these molded terminals are shown in FIGS. 3, 4 and 5 both being identical in form, being provided with an apertured upstanding lug portion 28A and a base portion 28B whose left-face 28C is serrated to provide a convenient means for burning the terminal to the upper portion 12B of member 12A which is notched to interfit with the serrated left face 28C as shown in FIG. 1. A lead fillet 12C provides a strong mechanical and electrical connection between the parts formed by a conventional burning step. The base 28B of the terminal has molded into it a metal tube 28D, which extends beyond the base and is fitted with nipples 28E for making hose connections as will be described further hereinafter.

For making intercell electrical connections in the battery, two types of molded connectors are provided, a short connector 32 for adjacent cells and a long connector 34 for the end cells. The details for the short connector 32 are shown in FIGS. 6 and 7 while the details for the long connectors 34 are shown in FIGS. 8, 9 and 10.

The short connector 32 is a bar-like member with serrated end portions to interfit with the notched end portion 12B and 13B of the cell terminals 12A and 13A as already described to with reference to the terminal 28. Fillets 12C and 13C (FIG. 1) are again provided by burning to provide the mechanical and electrical connections for the parts. A metal tube or fluid passage 32A is molded into the short connector 32 in a position parallel to the serrated end portions and is again provided with nipples 32B at the projecting end portions for making hose connection as will be described further hereinafter.

The long connector 34 is provided with open notches 34A and 34B at its ends which fit over the notched end portions 12B and 13B of the cell terminals (FIG. 9) the notch being provided with an oblique face 34C and 34D to provide space for the fillet 34E formed by burning to provide the mechanical and electrical connection. A metal tube or fluid passage 34F is molded into the long connector 34 being provided with nipples 34G at its projecting ends for hose connections.

When a battery of this type is charged, a heavy charging current is impressed on the battery to shorten the time required to fully charge the battery. The electrical resistance of the metal circuits and the chemical reactions in the battery cause heating which may cause undesirable temperatures to obtain in the battery which can be destructive so that cooling is required. The short pieces of metal tubing molded into terminals 28 and 30 and into the short and long connectors 32 and 34, provide a means for circulating a cooling liquid such as water through these metal parts of the battery for the cooling thereof, inasmuch as the heat from the battery interior is transmitted upwardly by the members 12A and 13A to these metal parts. The nipples on the tube ends are conveniently connected together in series by conduit means or short pieces of flexible tubing 36 of suitable elastomer material such as vinyl or the like. The cooling liquid is placed under pressure and caused to circuate in the tubes in a well known manner for attaining the cooling desired, the amount being readily controlled by controlling the pressure.

After the tubing 36 has been positioned on all of the nipples, the whole battery is leveled and receptacle 27 is covered with a liquid self-hardening resin E such as polyurethane to the level shown in FIG. 1 to encapsulate the connectors and terminals. The box walls 26A provide the necessary retaining walls for the liquid resin while it is hardening by self-polymerization. The central venting tubes 22 for the cells project above the resin to allow access to the cells for servicing as already described.

The smooth upper surface of the resin encapsulation protects the operator from contact with exposed battery portions in conventional constructions which may be at a high electrical potential to cause him harm. At the same time, contaminants which usually collect on the top of a battery, are easily removed and are not given an opportunity to form a low resistance leakage path for electrical potentials which could cause fires or at least self-discharge for the battery.

It is to be understood that the above detailed description of the present invention is intended to disclose an embodiment thereof to those skilled in the art, but that the invention is not to be construed as limited in its application to the details of construction and arrangement of parts illustrated in the accompanying drawing since the invention is capable of being practiced and carried out in various ways without departing from the spirit of the invention. The language used in the specification relating to the operation and function of the elements of the invention is employed for purposes of description and not of limitation, and it is not intended to limit the scope of the following claim beyond the requirements of the prior art.

What is claimed is:

1. A battery comprising a box, a plurality of cells disposed in said box, each cell including a case, positive and negative terminals and a cover cooperating with said case to form a sealed interior, said cell covers also cooperating with each other and said box to define an encapsulation material receiving receptacle, said terminals extending through said cell covers into said receptacle, a plurality of connectors electrically interconnecting said terminals and disposed in said receptacle, each connector including a fluid passage, conduit means interconnecting said fluid passages so that a fluid can be circulated to control the temperature within said cell interiors, and encapsulation material disposed in said receptacle and embedding said terminals, connectors and conduit means to provide electrical insulation for said terminals and connectors and mechanical protection for said terminals, connectors and conduit means.

References Cited

UNITED STATES PATENTS

| | | | |
|---|---|---|---|
| 2,855,453 | 10/1958 | Eidensohn | 136—161 |
| 3,179,538 | 4/1965 | Dalin | 136—161 X |
| 3,146,132 | 8/1964 | Nathan | 136—166 |
| 1,587,425 | 6/1926 | Schepp | 136—161 |
| 3,664,876 | 5/1972 | Carl | 136—160 |
| 3,290,176 | 12/1966 | Berju et al. | 136—161 X |

WINSTON A. DOUGLAS, Primary Examiner

C. F. LEFEVOUR, Assistant Examiner